United States Patent [19]

Inoue

[11] 4,212,275
[45] Jul. 15, 1980

[54] CARBURETOR

[75] Inventor: Mitsumasa Inoue, Yokohama, Japan

[73] Assignee: Nissan Motor Company, Limited, Yokohama, Japan

[21] Appl. No.: 847,611

[22] Filed: Nov. 1, 1977

[30] Foreign Application Priority Data

Nov. 5, 1976 [JP] Japan .................................. 51-132459

[51] Int. Cl.² ............................................ F02M 31/00
[52] U.S. Cl. .................................... 123/549; 123/557; 219/206; 219/207
[58] Field of Search ........... 123/122 F, 122 H, 122 E; 261/142; 219/206, 207, 307, 374, 375, 376, 381, 382, 505

[56] References Cited

U.S. PATENT DOCUMENTS

| 1,276,169 | 8/1918 | Buchmann | 123/122 F |
| 1,461,470 | 7/1923 | Ackley | 261/142 |
| 1,637,104 | 7/1927 | Crone | 123/122 F |
| 3,927,300 | 12/1975 | Wada | 219/381 |
| 3,987,772 | 10/1976 | McBride | 123/122 F |

Primary Examiner—Ronald H. Lazarus

[57] ABSTRACT

A carburetor in which a fuel evaporator using a "porous ceramic body" is disclosed. The "porous ceramic body" has a three-dimensional porous structure with open boxes. The three-dimensional porous structure comprises an electrically conductive ceramic with a positive temperature coefficient. The carburetor is provided with an electrical arrangement so as to permit current to flow through the "porous ceramic body" to cause it to produce heat.

5 Claims, 9 Drawing Figures

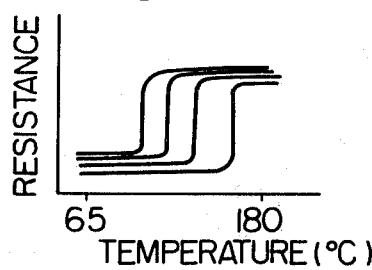
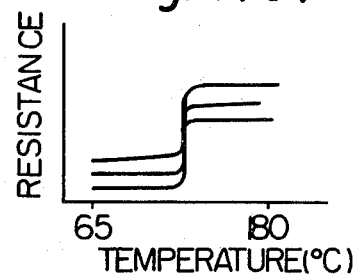
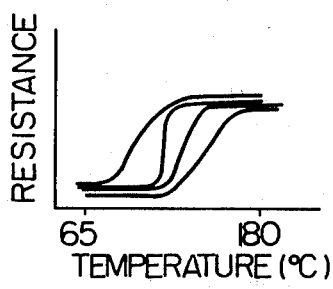
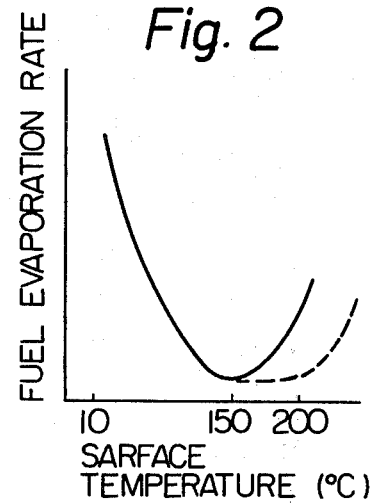
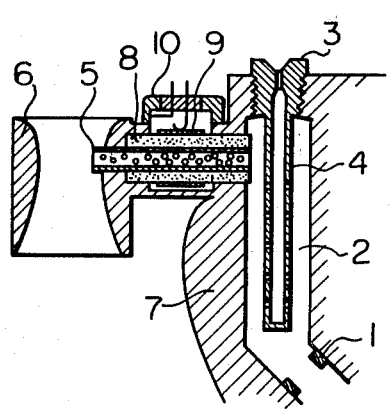

CARBURETOR

BACKGROUND OF THE INVENTION

The present invention relates to carburetors for automotive internal combustion engines, and more particularly to a carburetor using a three-dimensional high porosity porous structure formed basically of an electrically conductive ceramic with a positive temperature coefficient (PTC), the three-dimensional high porosity porous structure being referred to hereinafter as a "porous ceramic body."

A carburetor is known in which an air-fuel mixture tube is made of a porous sintered alloy to promote atomization of fuel thereby to prevent discontinuity of fuel supply from a main nozzle, which otherwise would occur to cause surging.

SUMMARY OF THE INVENTION

According to the invention, that portion of a carburetor which is exposed to fuel upon operation of the carburetor, such as a main nozzle, or a small venturi, or a large venturi, is formed of a "porous ceramic body" and an electrical arrangement is provided so as to permit current to flow through the "porous ceramic body" to cause it to produce heat. In this carburetor, not only the atomization of fuel, but also the evaporation of the fuel are promoted, particularly the evaporation of fuel drops adhered to carburetor wall, so that emission problem, fuel economy as well as driveability improve.

BRIEF DESCRIPTION OF THE DRAWINGS

The present invention will be described hereinafter with reference to the accompanying drawings, in which:

FIGS. 1(a) to 1(c) are graphs showing resistance-temperature curves of a PTC ceramic;

FIG. 2 is a graph showing fuel evaporation rate against surface temperature;

FIG. 3 is a fragmentary sectional view of a first embodiment of a carburetor of the invention;

DESCRIPTION OF THE PREFERRED EMBODIMENTS

Figure 4:
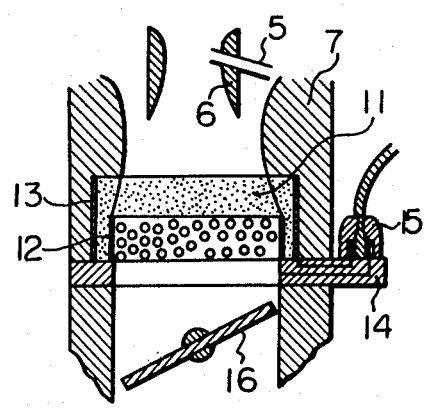
FIG. 4 is a fragmentary sectional view of a second embodiment of a carburetor of the invention.

A carburetor of the invention uses, as a fuel evaporator, a "porous ceramic body" which is formed basically of an electrically conductive ceramic with a positive temperature coefficient (PTC). The PTC ceramic is made of barium titanate etc, and has a positive temperature coefficient of electrical resistance, so its resistance increases as temperature rises within a range between 65 degrees C. to 180 degrees C. as shown in FIGS. 1(a) to 1(c).

FIG. 1(a) shows resistance-to-temperature curves of PTC ceramics different in proportion of their chemical composition and processing variables. As will be understood, resistance rapidly increases from a low resistance band to a high resistance band when temperature rises to a predetermined range. It will, therefore, be noted that adjusting or varying chemical composition and processing variables of PTC ceramic will make it possible for us to provide desired temperature range at which resistance changes rapidly.

It will be noted from FIG. 1(b) that suitably adjusting chemical composition and processing variables of PTC ceramic will make it possible for us to change low and high resistance bands with change-over temperature held substantially unchanged.

It will be noted from FIG. 1(c) that suitably varying proportion of components of PTC ceramic will make it possible for us to change a gradient of a resistance-to-temperature curve as resistance increases from a low resistance band to a high resistance band.

Another feature of PTC ceramic resides in that if current flows through it, it will produce heat. Heat radiation increases as resistance decreases tending to decrease temperature around PTC ceramic, whereas, heat radiation decreases as resistance increases tending to increase temperature around the PTC ceramic. Therefore, temperature around the PTC ceramic will be controlled within a predetermined range. In other words, PTC ceramic, when used as a heat source, has a temperature self-control function.

The construction of a "porous ceramic body" is a three-dimensional high porosity porous structure having open bores and formed basically of a PTC ceramic. The surface of the "porous ceramic body" is rough or rugged.

Preferably, a "porous ceramic body" has standards as follows:

number of cells: 8 to 100 per 25 mm$^2$
porosity: more than 70 percent
specific resistivity of the PTC ceramic: 100 $\Omega$cm to 100 M$\Omega$cm.

FIG. 2 shows a period of time required for a unit of volume of gasoline to become vapor as against the surface temperature of a heater surface. The solid line curve shows the relationship when the heater surface is smooth, whereas, the dashed line curve shows the relationship when the heater surface is rugged.

Referring to the solid curve, the evaporation efficiency is best when the surface temperature is around 150 degrees C. If the temperature increases further, the efficiency reduces because gasoline forms into drops rolling on the heater surface. However, with the rugged surface, the efficiency remains good even if the temperature increases further (see the dashed curve in FIG. 2). Therefore, the temperature range during which the evaporation efficiency is best is wider with the rugged surface than with the smooth surface.

"Porous ceramic body" has a PTC characteristic so that its surface temperature can be kept around that temperature range during which fuel evaporation efficiency is best (see FIG. 2). With PTC characteristic, if environmental temperature rises, the amount of heat radiation from "porous ceramic body" decreases to keep the surface temperature thereof within the predetermined range. Therefore, it will be understood that "porous ceramic body" is most suitable for a fuel evaporator to be used within a carburetor.

FIG. 3 shows a carburetor, in which denoted by the reference numeral 1 is a main jet; 2 a main well; 3 a main air bleed; 4 an emulsion tube; 5 a main nozzle; 6 a small venturi; and 7 a large venturi. Denoted by the reference numeral 8 is a cylindrical "porous ceramic body" jacketing an apertured main nozzle tube of a metal having a number of tiny holes. The cylindrical "porous ceramic body" 8 is received within a metal sleeve 9. The apertured main nozzle tube 5 serves as a negative terminal, while, the metal sleeve 9 serves as a positive terminal. The apertured main nozzle tube 5 and the sleeve 9 are electrically connected with respective terminals of a consent 10 for a source of electricity.

The operation of this embodiment is as follows:

Fuel tends to flow along the wall of the main nozzle tube 5 during operating conditions when the amount of fuel flowing through the nozzle 5 is little. Under this condition, some of the fuel is vaporized receiving heat from the cylindrical "porous ceramic body" 8, but the remaining portion of the fuel penetrates or is adsorbed into the cylindrical "porous ceramic body" 8 through the holes of the apertured main nozzle tube 5. The fuel portion penetrated or is adsorbed into the cylindrical "porous ceramic body" 8 will constitute a bypass flow. Since, the temperature of the cylindrical "porous ceramic body" 8 is kept around 150 degrees C., the fuel will be soon evaporated and reappear in the main nozzle 5.

Therefore, the discontinuous fuel supply from the main nozzle 5, during the above-mentioned operating conditions, such as, when the vehicle runs at 20 km/h with top gear, is prevented, preventing delay in response to change in load demand and surging.

Since it is not necessary to heat the main nozzle 5 during the remaining operating conditions, it is preferred to provide means for cutting current flow through the cylindrical "porous ceramic body" in response to the throttle opening degree, engine speed and the like.

FIG. 4 shows a second embodiment of carburetor in which denoted by the reference numeral 11 is a cylindrical "porous ceramic body," 12 an apertured metal tube which acts as a plus terminal, 13 a metal sleeve which acts as a minus terminal, 14 an insulator, 15 a consent for a source of electricity, and 16 a throttle valve.

Figure 5:
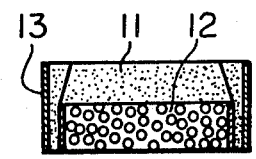
FIG. 5 is an assemble view of parts before assembling with the carburetor as shown in FIG. 4.

Referring also to FIG. 5, the metal tube 12 and the metal sleeve 13 are secured, such as by welding, or adhesives, to the inner and outer walls of the cylindrical "porous ceramic body" 11. The opening size of each of the holes formed in the metal tube 12 is around 1 mm in diameter. The assembly, as above mentioned, is mounted with the carburetor to form a skirt portion the large venturi 7. The insulator 14 is formed with a projected tap for connection with the consent 15. Embedded within the insulator 14 are two leads, one leading from the tap to the metal sleeve 13, the other leading from the tap to the metal tube 12.

Figure 6:
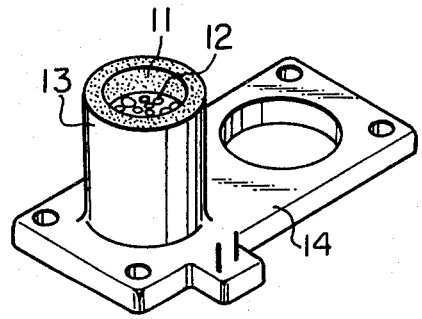
FIG. 6 is a similar view to FIG. 5 showing one alternative.

As shown in FIG. 6, the cylindrical "porous ceramic body" 11, the metal tube 12 and the metal sleeve 13 can be assembled with the insulator 14 before mounting to the carburetor.

The operation of this embodiment is as follows:

Fuel from the main nozzle 5 diverges so that fuel droplets adhere to skirt portion of the large venturi 7. These fuel droplets flow down along the skirt portion and contact with the rugged surface of the cylindrical "porous ceramic body" 11 and penetrate thereinto. The thus penetrated fuel forms a bypass flow and evaporated to reenter into the induction passage through the apertured metal tube 12.

Figure 7:
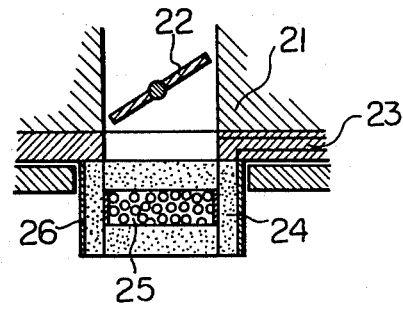
FIG. 7 is a fragmentary sectional view of a third preferred embodiment of a carburetor of the invention.

FIG. 7 shows a third embodiment of a carburetor in which denoted by the reference numeral 21 is a throttle chamber, 22 a throttle valve, 23 an insulator, 24 a cylindrical "porous ceramic body," 25 an apertured metal tube having a number of tiny holes, serving as a plus terminal, and 26 a metal sleeve serving as a minus terminal. An upstream section of the cylindrical "porous ceramic body" 24 and the metal tube 25 define the wall of an extension portion of the carburetor.

The operation of this embodiment is similar to the beforementioned embodiments.

What is claimed is:

1. In an internal combustion engine having an induction system: an air-fuel mixture forming means and an, induction passage leading to said internal combustion engine; and means disposed within said air-fuel mixture forming means and said induction passage for adsorbing a portion of the fuel fed to said internal combustion engine in an unvaporized state and reintroducing said portion into said induction passage in a vaporized state, said means taking the form of a porous ceramic body made of an electrically conductive material having a positive temperature coefficient and an apertured metal member disposed in said induction passage in contact with said porous ceramic body, which apertured metal member serves as one of two electrical contacts of said porous ceramic body and which apertured metal member further serves to receive said vaporized fuel through said apertures to mix the same with the air-fuel mixture passing through the induction passage.

2. The combination as claimed in claim 1, in which said "porous ceramic body" has standards as follows:
number of cells: 8 to 100 per 25 mm$^2$
porosity: more than 70 percent
specific resistivity of said ceramic: 100 $\Omega$cm to 100 M$\Omega$cm 3. A carburetor as claimed in claim 1, wherein said porous ceramic body has an annular configuration and is disposed in said induction passage so as to be coaxial therewith.

4. A carburetor as claimed in claim 1, wherein said apertured metal member takes the form of a tube which is received in an opening formed in said porous ceramic body.

5. In a carburetor:
an induction passage having a venturi portion;
a main well in fluid communication with a source of fuel;
a conduit formed with a plurality of holes therein, which define a main nozzle and leads from said main well to said induction passage so as to project into said venturi portion for delivering fuel into said induction passage;
a porous ceramic body disposed about a part of said main nozzle so as to be in fluid contact with the fuel flowing in said main nozzle via, plurality of holes, said porous ceramic body being electrically conductive and having a positive temperature coefficient and defining bypass flow means for adsorbing a portion of the fuel flowing in said conduit, heating the same and re-introducing said portion of fuel into the main nozzle in a vaporized state through said plurality of holes.

* * * * *